Nov. 23, 1954  D. WILLIAMS, JR  2,694,905
AIR CONDITIONER

Filed May 11, 1951  2 Sheets-Sheet 1

INVENTOR.
Don Williams, Jr
BY
Edward M. Shealy
His Attorney

Nov. 23, 1954   D. WILLIAMS, JR   2,694,905
AIR CONDITIONER

Filed May 11, 1951   2 Sheets-Sheet 2

INVENTOR.
Don Williams, Jr.
BY
Edward M. Shealy
His Attorney

United States Patent Office 2,694,905
Patented Nov. 23, 1954

2,694,905

AIR CONDITIONER

Don Williams, Jr., Albuquerque, N. Mex.

Application May 11, 1951, Serial No. 225,842

5 Claims. (Cl. 62—5)

The present invention relates to new and useful improvements in air conditioning and more particularly the present invention relates to such apparatus of a portable type which is adapted for use in connection with vehicles, aircraft and the like.

The chief features of this system lie in the design of a low pressure still absorption refrigeration cycle which utilizes the present internal combustion engine's liquid cooling system as the basis for the development of the cycle.

The most practical refrigeration cycle, from the economy standpoint, for use with an internal combustion engine is the absorption cycle. This is because this cycle uses heat as its source of power, and such an engine has a great deal of waste heat to dispose of, which may be used for this purpose. Attempts have been made in the past to adapt a standard high pressure ammonia cycle to this job, but they occupy a great deal of valuable space and add considerably to the weight of an automobile, as well as necessitating the use of high pressure components throughout the system. If the present engine liquid cooling system is used as part of the absorption refrigeration cycle, a large portion of the heavier, more bulky equipment may be eliminated. If the present standard ammonia absorption cycle is used, a complete re-design of the engine cooling system is required, because of the high operating pressures involved. To eliminate this my invention contemplates the use of refrigerant which will operate at or near to atmospheric pressure. By the addition of a by-pass line and selector valve this refrigeration system may be converted into an optional heating and cooling system. This combined system described herein presents a practical solution to the all weather air conditioning problem in vehicles.

One object then of the present invention is to provide a system of the character described which is useful for providing either heat or cold to the air as may be desired by the user.

Another object of the present invention is to provide a heating or refrigerating system which may be used with a heat engine and especially with the internal combustion engine as used in vehicles.

Another object of the present invention is to provide a system of the character described which is of simple construction, light in weight and which will occupy only a small amount of space.

Still another object of the present invention is to provide a system of the character described in which the engine cooling system is automatically protected against freezing up during cold weather.

Yet another object of the present invention is to provide a system of the character described which will utilize a low pressure system and in which the cooling system presently in use on the heat engine may be utilized without radical changes being necessary.

Still another object of the present invention is to provide a system of the character described in which waste heat from the engine cooling system is utilized to operate the present new and novel system.

Still another object of the present invention is to provide a system of the character described which is simple in construction, highly efficient in operation and economical to manufacture.

With the above and other objects in view as will appear as the description proceeds, the invention consists in the novel construction, combination and arrangement of parts, as hereinafter more specifically set forth, claimed and shown in the accompanying drawings which form a part of this application for Letters Patent.

In the accompanying drawings I have illustrated preferred and practical embodiments of my invention, it being understood, however, that the drawings are merely illustrative and that my inventive-concept is susceptible of other embodiments and utilizations, and that the illustrated embodiments likewise are susceptible of a wide range of variation and modification without departing from the spirit of my invention or the scope of the appended claims.

In these drawings which accompany and form a part of this specification, and in which like reference numerals are used to designate the same or like parts throughout the several figures.

In order to simplify the description of the new and novel air conditioning system of my invention and its operation, each of three fluid cycles will be treated separately as if only one fluid was involved in each. Actually, there is a mixture of all three fluids to a greater or lesser degree throughout all portions of the system. This condition acts to slightly modify the actions described herein to a small extent, but the overall result is exactly the same as described. In this description ethyl alcohol will be used as an example of the refrigerant, and water and air will be used as examples of the absorption fluid and carrier gas respectively and the system has been described in conjunction with a conventional automobile engine; all of these examples have been used to simplify the description and it is to be understood that they have been given by way of illustration and not by way of limitation, since many other refrigerants etc., may be used with equal success.

Figure 1:
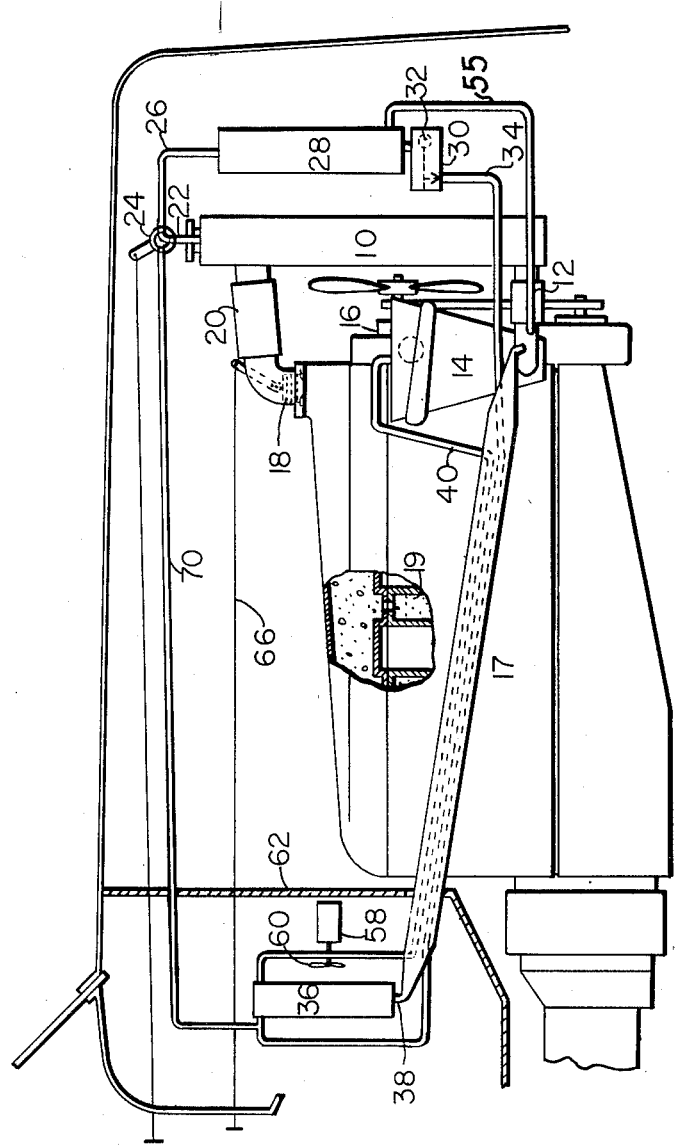
Fig. 1 is a side elevational view of the forward end of a standard automobile showing the air condition system of the present invention installed on the engine thereof.
Figure 3:
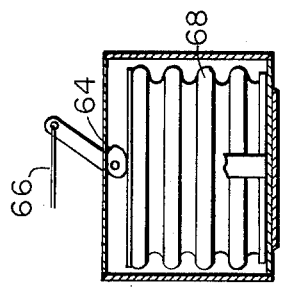
Fig. 3 is a detailed cut away view of the adjustable thermostatically controlled valve of the present invention.

Referring now in detail to the drawings, the reference numeral 10 has been used to generally designate an automobile radiator of conventional design where the engine cooling water is cooled. The automobile radiator 10 is connected to an absorber unit 14 by means of a hose connection 12 as is shown most clearly in Fig. 1. The cooled engine cooling water passes down through the automobile radiator 10, through the lower hose connection 12 and into the absorber 14. In the absorber unit 14 the cooled engine cooling water comes into intimate contact with an air and alcohol vapor mixture. The alcohol is absorbed by the water in the absorber 14 and passes on with it to a circulating pump 16 which is connected to the absorber 14 by means of a hose connection (not shown). The water alcohol mixture just described is then pumped by the circulating pump 16 through conventional cooling passages 19 in the automobile engine 17. The water alcohol mixture in the cooling passages in the engine absorbs heat from the engine and the alcohol is boiled out of the mixture. The mixture of alcohol vapor and water then passes out from the cooling passages past the adjustable thermostatic control valve 18 and back into the top of the automobile radiator 10 through the connecting means 20. At the top of the automobile radiator 10 the alcohol vapor separates from the water which passes down through the automobile radiator 10 where it is cooled, and the water then repeats its cycle of operation.

When the alcohol vapor separates from the engine cooling water at the top of the automobile radiator 10 is leaves the top of the automobile radiator 10 through the tube 22, passing through the selector valve 24, whose operation will be described hereinafter, which is connected to the top of a condenser 28 by means of the tube 26. In the condenser 28 the alcohol vapor is cooled and becomes a liquid. The liquid alcohol then flows from the bottom of the condenser 28 preferably to a float controlled pressure-reducing valve 30, although this float controlled pressure-reducing valve may be omitted if desired, without substantially affecting the operation of the air conditioning system. As the liquid alcohol rises in the pressure-reducing valve 30, the float 32 is lifted and the liquid alcohol is allowed to pass on the evaporator 36 which is connected to the pressure-reducing valve 30 by means of the tube 34. In the evaporator 36 the liquid alcohol comes into the presence of air and evaporates under its own partial pressure, absorbing heat. The mixture of alcohol vapor and air then passes on to the absorber 14 which is connected to the evaporator 36 by means of the tube 38 where the alcohol vapor is absorbed by the water, as previously described.

Figure 2:
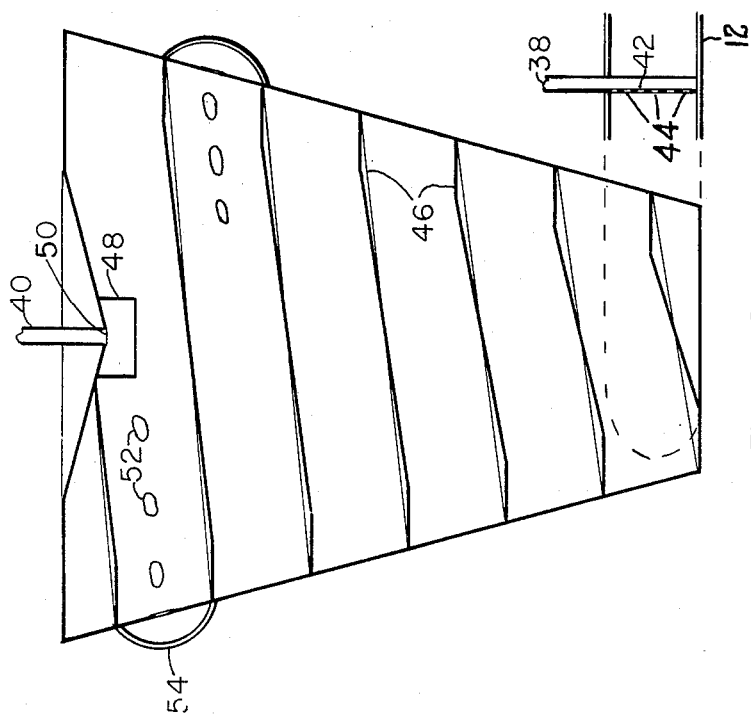
Fig. 2 is a detailed sectional view of the absorber unit of Fig. 1.

The air in the new and novel air condition system of my invention is separated from the water and absorbed alcohol in the absorber 14 and passes to the evaporator 36 through the tube 40. In the evaporator 36 the air mixes with the alcohol vapor as it evaporates, as previously described. The air-alcohol vapor mixture is then carried to the absorber 14 through the tube 38. The air is then separated from the water after the alcohol is absorbed as has been previously described, and the air is then returned through its cycle. In order to insure correct operation of the air cycle a small aspirator 42 or pump may be used to pump the air-alcohol vapor mixture into the absorber 14 and out of the evaporator 36, as is shown most clearly in Figs. 2.

In order to insure the most efficient operation, the tubes 34 and 40 may pass through the large tube 38 on their way to the evaporator, this arrangement then acting as a type of heat exchange unit, warming the cool fluid in the tube 38 and cooling the warm fluids carried by the tubes 34 and 40. This arrangement then increases the effectiveness of the evaporator unit 36.

The absorber unit 14 as described is unique in several respects. In order to insure the operation of the gas cycle, as described, a gas pump in the form of an aspirator unit 42 is used. Through this aspirator 42 the gas and refrigerant vapor mixture is introduced into the liquid stream just before it enters the absorber body. To accomplish this the tube 38 is run through the water inlet tube 12 of the absorber 14. Holes 44 are drilled along the length of the tube 38 inside the large tube 12 in such a manner that as the water rushes through the tube 12 it will produce a vacuum on these holes 44 and thus will draw the air-alcohol vapor mixture through the holes 44 and into the water stream. The air and refrigerant vapor mixture is thus thoroughly mixed with the liquid as it enters the body of the absorber 14 where it begins a swirling whirlpool motion. The refrigerant vapor is almost immediately absorbed by the liquid and the whirling of the liquid forces the gas toward the center, thus leaving the liquid free of gas bubbles around the outside. Thus the gas and liquid, along with the absorbed refrigerant vapor are separated by centrifugal force after the absorption process has taken place. There is a spiral guide 46 inside the absorber 14 to control the swirling motion of the water. The sides of the absorber 14 may be slanted so that it is larger at the top than it is at the bottom, as is shown most clearly in Figs. 1 and 2. This is done to increase the separation effect between the air bubbles and the liquid in the absorber 14. Air passes out of the absorber 14 into the tube 40 through an opening 50 in the top of the absorber 14. A guard 48 may be used to protect the opening 50 from water spray. The water leaves the absorber 14 through a series of holes 52 around the sides of the absorber 14, the holes 52 communicating with a duct 54 which then carries the water on to the connection with the engine circulating pump 16. Heat that is generated by the absorption process is dissipated through the walls of the absorber 14 and this heat transfer may be increased by means of cooling fins (not shown) on the absorber 14.

As previously described, the separation of the refrigerant vapor and liquid after the mixture leaves the engine 17 occurs in the top of the radiator 10. In this area the liquid slows down allowing the vapor to separate from the liquid. Since the top of the radiator 10 is relatively cool, it also tends to cool the vapors which thus allows much of the water vapor to condense. This action is quite similar to the so-called analyzer in the standard absorption cycle.

If desired, a separator unit (not shown) may be added to the new and novel air conditioning system of my invention. The separator might be of either the centrifugal or settling basin type. Similarly, devices for condensing water vapor from the refrigerant cycle, although not described in the present disclosure, may be added without departing from the spirit of the present invention or the scope of the appended claims. It is felt that the advantages of simplicity of operation, size and construction are more important than efficiency of operation of the units involved, since there is a great deal of waste heat from the engine 17 which may be utilized without regard to absolute efficiency of the system.

The condenser unit 36 in general, may be of conventional construction. To insure the correct operation of the condenser 28, to prevent it from becoming flooded, and to insure flow of refrigerant vapor from the top of the radiator into the condenser 28, a connection 55 may be made from the condenser 28 to the liquid cycle as it enters the absorber 14, as is shown most clearly in Fig. 1. Normally, the pressure differential between these two points is great enough to insure flow in the correct direction. If, however, under certain circumstances this is not the case the addition of an aspirator pump (not shown) on the discharge side of the line, will insure correct and proper operation. A uni-directional throttle valve (not shown) may also be added to control the amount of flow through this line 54.

As the liquid refrigerant leaves the condenser 28 it may be passed through a pressure-reducing device 30 before entering the evaporator 36. This has been found to be desirable because of the pressure differential throughout the system caused basically by the engine cooling system circulating pump 16. As shown and described this may be a float controlled pressure-reducing valve. As the condensed refrigerant is collected in this valve 30 it causes the float 32 to open the valve 30 allowing liquid refrigerant to pass on to the evaporator. If desired, other devices, well known to those skilled in the art to which this invention pertains might also be used to accomplish the same result.

The evaporator 36 may be of conventional design and is shown with a motor 58 carrying a fan 60 in order to circulate air from the interior of the vehicle over the cooling fins (not shown). Normally, the evaporator and fan unit will be placed inside the vehicle, as inside the fire wall 62 so that the interior of the vehicle may be readily heated or cooled by it. However, the motor and fan might be eliminated or the location of the evaporator 36 changed, without departing from the spirit of the present invention or the scope of the appended claims.

The system as described may be controlled basically by controlling the operating temperature of the engine 17. In the example given, this may be accomplished by means of an adjustable thermostatically controlled valve 18 in the liquid cycle line. The valve 18 slows the circulation in the liquid cycle to increase the temperature in the engine which in turn boils out more refrigerant and thus increases the cooling. The valve 18 may be basically a standard thermostatic valve commonly employed in internal combustion engine cooling systems. The addition of a cam 64, which is positioned by the linkage 66 from the passenger compartment of the vehicle, provides means for increasing or decreasing the tension on the bellows 68, which in turn raises or lowers the temperature at which the valve 18 will open. As shown, the valve 18 is manually controlled, but it could also be made automatic in operation by means of a thermostat which could be installed in the passenger compartment of the vehicle. Louvers (not shown) might also be installed in front of the radiator 10 to increase control of the system, as desired. Other devices which operate to control the engine temperature might also be utilized to provide means for controlling the new and novel air conditioning system of the present invention.

In order to convert the air conditioning system to a heating system it is only necessary to add a simple by-pass 70 around the condenser 28 which will allow hot refrigerant vapor to pass directly to the evaporator 36 which then becomes a heating coil. The by-pass 70 may be controlled by a selector valve 24 which may be controlled from the passenger compartment of the vehicle, by any suitable means. The remainder of the system operates as previously described in connection with the cooling cycle.

It is to be understood that the forms of my invention herein shown and described are to be taken as preferred and practical embodiments of the same, and that various changes may be made in the shape, size and arrangement of parts without departing from the spirit of my invention or the scope of the appended claims.

Having thus described my invention, what I claim and desire to secure by Letters Patent is:

1. A low pressure refrigerator system of the gas absorption type for installation in a motor vehicle having an internal combustion engine provided with the standard radiator and a cooling circuit including a pump circulating water through the water jacket of said engine and said radiator, said system including a sealed refrigerant circuit, a sealed carrier gas circuit and a water circuit, said water circuit being comprised of the cooling water circuit of said engine, the radiator of said engine forming an analyzer for the water and refrigerant circuits to separate said water and refrigerant fluids after they have been combined for heating of the mixed fluids in the cooling jacket of said engine, and a manually adjustable thermostatically controlled valve interposed in the cooling circuit of said engine.

2. A low pressure refrigeration system of the gas absorption cycle type for installation in a motor vehicle having an internal combustion engine provided with a standard radiator and a cooling circuit including a pump circulating water through the water jacket of said engine and said radiator, said system including a condenser positioned in the air stream of said vehicle, an evaporator, means for conducting refrigerant in a gaseous state from the head of said radiator to the inlet of said condenser, means for conducting liquefied refrigerant from the outlet of said condenser to the inlet of said evaporator, an absorber interposed in the water cooling circuit at a point between the outlet of said radiator and said cooling jacket, means for conducting carrier gas from the top of said absorber to the inlet of said evaporator, means for conducting mixed refrigerant and carrier gas from the outlet of said evaporator to the inlet of said absorber, and a pressure reducing tank having a float controlled valve interposed in the conducting means between the outlet of said condenser and the inlet of said evaporator.

3. A low pressure refrigeration system of the gas absorption cycle type for installation in a motor vehicle having an internal combustion engine provided with a standard radiator and a cooling circuit including a pump circulating water through the water jacket of said engine and said radiator, said system including a condenser positioned in the air stream of said vehicle, an evaporator, means for conducting refrigerant in a gaseous state from the head of said radiator to the inlet of said condenser, means for conducting liquefied refrigerant from the outlet of said condenser to the inlet of said evaporator, an absorber interposed in the water cooling circuit at a point between the outlet of said radiator and said cooling jacket, means for conducting carrier gas from the top of said absorber to the inlet of said evaporator, means for conducting mixed refrigerant and carrier gas from the outlet of said evaporator to the inlet of said absorber, the means for conducting mixed refrigerant and carrier gas from said evaporator comprising an enlarged conduit, and the means for conducting refrigerant from the outlet of said condenser to the inlet of said evaporator and the means for conducting carrier gas from the top of said absorber to the inlet of said evaporator being positioned within said enlarged conduit in heat exchange relationship for the greater portion of their lengths, thereby increasing the efficiency of said system.

4. A low pressure refrigeration system of the gas absorption cycle type for installation in a motor vehicle having an internal combustion engine provided with a standard radiator and a cooling circuit including a pump circulating water through the water jacket of said engine and said radiator, said system including a condenser positioned in the air stream of said vehicle, an evaporator, means for conducting refrigerant in a gaseous state from the head of said radiator to the inlet of said condenser, means for conducting liquefied refrigerant from the outlet of said condenser to the inlet of said evaporator, an absorber interposed in the water cooling circuit at a point between the outlet of said radiator and said cooling jacket, means for conducting carrier gas from the top of said absorber to the inlet of said evaporator, means for conducting mixed refrigerant and carrier gas from the outlet of said evaporator to the inlet of said absorber, said absorber comprising a container of inverted frusto-conical shape, said container having an inlet tube opening into the side wall thereof adjacent the base with the axis of said tube substantially tangent to said base, said container further having a continuous helical rib on the inside wall thereof, a plurality of apertures in said side wall between the turns of said rib, a conduit formed on the outside wall over said apertures to receive the mixed water and refrigerant forced therethrough by the centrifugal action of said fluid and conduct the mixture to said heating jacket, and an outlet in the top wall thereof to receive released carrier gas for conduction to said evaporator.

5. A low pressure refrigeration system of the gas absorption cycle type for installation in a motor vehicle having an internal combustion engine provided with a standard radiator and a cooling circuit including a pump circulating water through the water jacket of said engine and said radiator, said system including a condenser positioned in the air stream of said vehicle, an evaporator, means for conducting refrigerant in a gaseous state from the head of said radiator to the inlet of said condenser, means for conducting liquefied refrigerant from the outlet of said condenser to the inlet of said evaporator, an absorber interposed in the water cooling circuit at a point between the outlet of said radiator and said cooling jacket, means for conducting carrier gas from the top of said absorber to the inlet of said evaporator, means for conducting mixed refrigerant and carrier gas from the outlet of said evaporator to the inlet of said absorber, and means within said absorber for subjecting the mixture of refrigerant carrier gas and water entering said absorber to centrifugal action to thereby increase refrigerant absorption efficiency and separate the carrier gas therefrom.

References Cited in the file of this patent
UNITED STATES PATENTS

| Number | Name | Date |
|---|---|---|
| 662,690 | Geppert | Nov. 27, 1900 |
| 1,955,345 | Sarnmark | Apr. 17, 1934 |
| 1,985,636 | Foss | Dec. 25, 1934 |
| 2,481,520 | Knoy | Sept. 13, 1949 |